United States Patent
Hatcher, Jr. et al.

(10) Patent No.: US 9,850,937 B2
(45) Date of Patent: Dec. 26, 2017

(54) FASTENER-REMOVAL METHOD AND ASSEMBLY INCLUDING A FASTENER-REMOVAL MEMBER INTEGRALLY CONSTRUCTED WITH A WASHER MEMBER

(71) Applicant: Siemens Energy, Inc., Orlando, FL (US)

(72) Inventors: Clifford Hatcher, Jr., Orlando, FL (US); James P. Williams, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 471 days.

(21) Appl. No.: 14/325,817

(22) Filed: Jul. 8, 2014

(65) Prior Publication Data

US 2016/0010681 A1    Jan. 14, 2016

(51) Int. Cl.
| | | |
|---|---|---|
| F16B 43/00 | (2006.01) | |
| F02C 7/32 | (2006.01) | |
| F16B 39/22 | (2006.01) | |
| F23R 3/60 | (2006.01) | |

(52) U.S. Cl.
CPC .............. *F16B 43/003* (2013.01); *F02C 7/32* (2013.01); *F16B 43/00* (2013.01); *F16B 39/22* (2013.01); *F23R 3/60* (2013.01)

(58) Field of Classification Search
CPC ........ F16B 43/00; F01D 24/243; B25B 13/04; F02C 7/20; F02C 7/32; F23R 3/60; F23R 3/283; F23R 2900/00017
USPC ...... 411/147, 160, 531, 409, 435; 415/214.1
See application file for complete search history.

(56) References Cited

U.S. PATENT DOCUMENTS

| | | | | |
|---|---|---|---|---|
| 1,435,433 | A | * 11/1922 | Triggs | ................. F16B 5/06 123/65 R |
| 1,697,954 | A | * 1/1929 | Gribbie | ................. H01R 11/12 411/165 |
| 2,157,516 | A | * 5/1939 | Young | ................. F16B 43/00 411/543 |
| D235,878 | S | * 7/1975 | Candiotti | .................... D13/148 |
| 4,570,759 | A | * 2/1986 | Ferret Bofill | ......... F16D 55/226 188/73.32 |
| 4,808,130 | A | * 2/1989 | Lee | .................. H01R 11/12 439/433 |
| 4,836,708 | A | 6/1989 | Chambers et al. | |

(Continued)

OTHER PUBLICATIONS

Precision Metalforming Association, The Washer Division, "Facts About Washers", Fourth Edition, 1992, pp. 1-27, Richmond Heights, OH, US.

*Primary Examiner* — Flemming Saether

(57) ABSTRACT

Fastener-removal method and assembly including a washer member (22) integral with a fastener-removal member (26) are provided. A fastener (16) may be disposed in a through hole (24) in the washer member. The fastener-removal member is arranged to receive a mechanical force effective to remove the fastener. Embodiments of the disclosed assembly are effective for quick removal of relatively high-strength fasteners, as may be used in combustion turbine engines, without having to directly apply torque to structures of the fastener, such as the head of a fastener, and thus reducing the possibility of damage to the fastener during servicing operations of the turbine engine involving fastener removal.

14 Claims, 3 Drawing Sheets

(56) References Cited

U.S. PATENT DOCUMENTS

| | | | |
|---|---|---|---|
| 7,963,034 B2 * | 6/2011 | Dejaune | F01D 5/066 29/889 |
| 8,579,572 B1 | 11/2013 | Psimas | |
| 8,628,312 B2 * | 1/2014 | Bergman | F04C 18/0215 411/119 |
| 8,881,395 B2 * | 11/2014 | Dessoly | F01D 5/066 29/458 |
| 9,322,334 B2 * | 4/2016 | Casavant | F02C 7/20 |
| 9,416,682 B2 * | 8/2016 | Ruberte Sanchez | F01D 25/24 |
| 9,513,011 B2 * | 12/2016 | Carlson | F23R 3/283 |
| 2017/0167297 A1 * | 6/2017 | Merlau | F01D 25/28 |

* cited by examiner

FASTENER-REMOVAL METHOD AND ASSEMBLY INCLUDING A FASTENER-REMOVAL MEMBER INTEGRALLY CONSTRUCTED WITH A WASHER MEMBER

FIELD OF THE INVENTION

The present invention is generally related to fasteners, and, more particularly, to fastener-removal method and assembly including a fastener-removal member integrally constructed with a washer member.

BACKGROUND OF THE INVENTION

Galling is an issue that can commonly arise in threaded fasteners. Galling can result in damage to the threaded features or seizing of said fasteners. Such damage or seizing can often be costly to repair or remedy. For example, in a turbine engine as may be used for power generation, certain turbine engine components may be fastened to a casing of the engine by way of bolts that may involve relatively high levels of torque. During servicing operations involving removal of such bolts, damage to the heads or even breakage of such fasteners can occur. This can result in an increased outage time of the turbine engine, and incremental costs for replacing the damaged components.

BRIEF DESCRIPTION OF THE DRAWINGS

The invention is explained in the following description in view of the drawings that show.

DETAILED DESCRIPTION OF THE INVENTION

The present inventors propose an innovative assembly and methodology that can be used to reliably and cost-effectively remove fasteners without damaging the fasteners. The proposed assembly is effective for quick removal of fasteners without having to directly apply torque to structures of the fastener. For example, in the case of a fastener comprising a bolt, the removal of the fastener may be advantageously performed without having to contact the head of the bolt.

Figure 1:
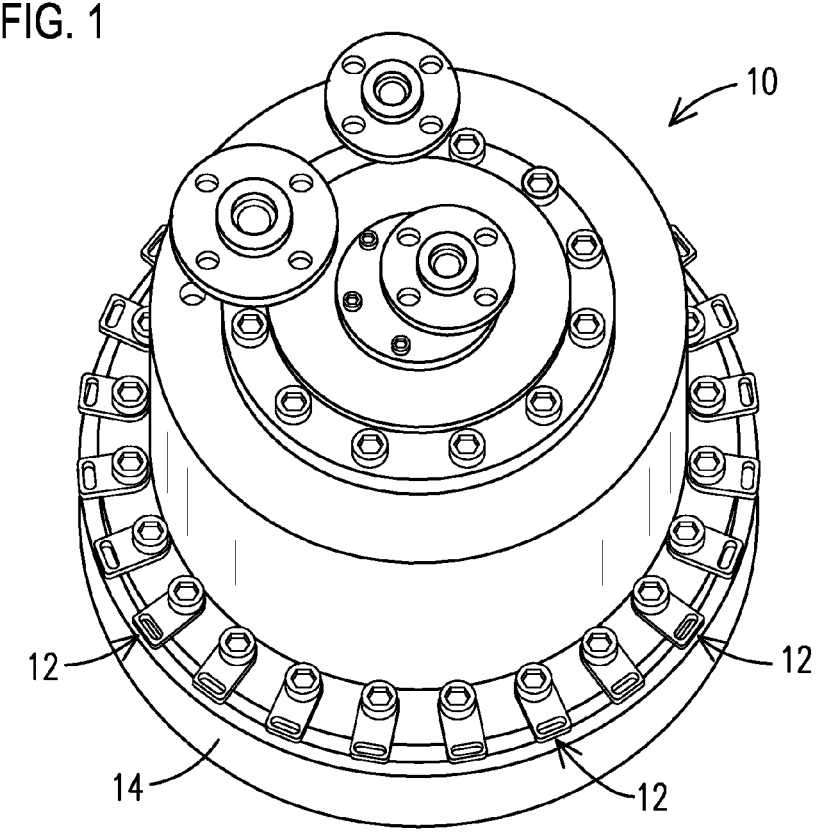
FIG. 1 is an isometric view of one non-limiting example of a turbine engine component that can benefit from a plurality of assemblies embodying aspects of the present invention.
Figure 2:
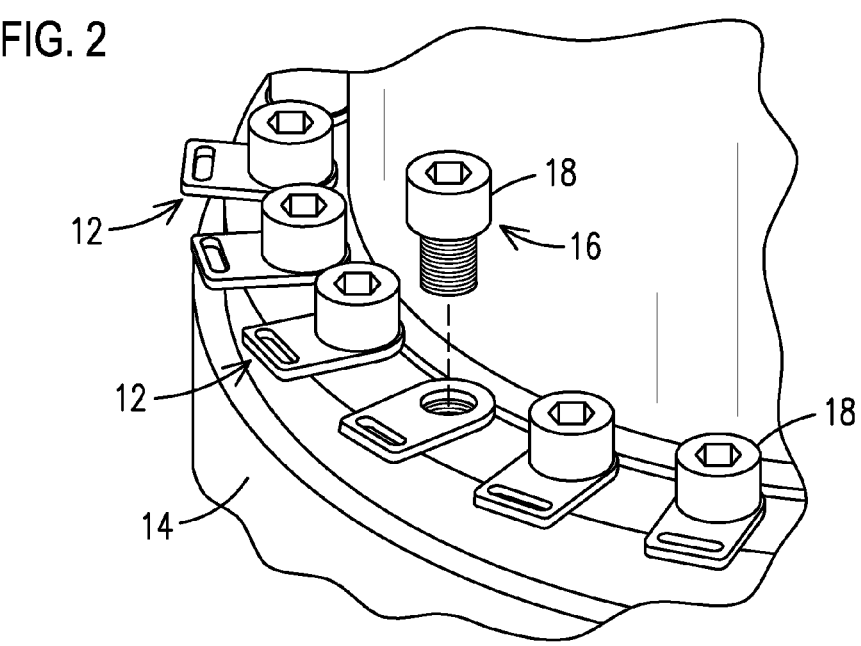
FIG. 2 is an isometric view illustrating further details regarding an assembly embodying aspects of the present invention.

FIG. 1 is an isometric view in a combustion turbine engine of one non-limiting example of a turbine engine component 10, such as a combustor, that may benefit from a plurality of assemblies 12 embodying aspects of the present invention. FIG. 1 illustrates a structure 14 (collo- quially referred to as a "top hat") of the combustor of the turbine engine that may be affixed to a casing of the engine by way of assemblies 12, each receiving a fastener 16 (one of such fasteners is shown in exploded view in FIG. 2). In one non-limiting embodiment, fastener 16 may comprise a bolt including a head 18. Other non-limiting examples of fastener 16 may include studs, threaded fasteners, etc. It will be appreciated that aspects of the present invention are not limited either to turbine engine components or to any specific turbine engine component. For example, it is contemplated that assemblies 12 could be adapted for automotive fastening applications. Accordingly, the structures shown in FIGS. 1 and 2 should be construed in an example sense and not in a limiting sense.

Figure 3:
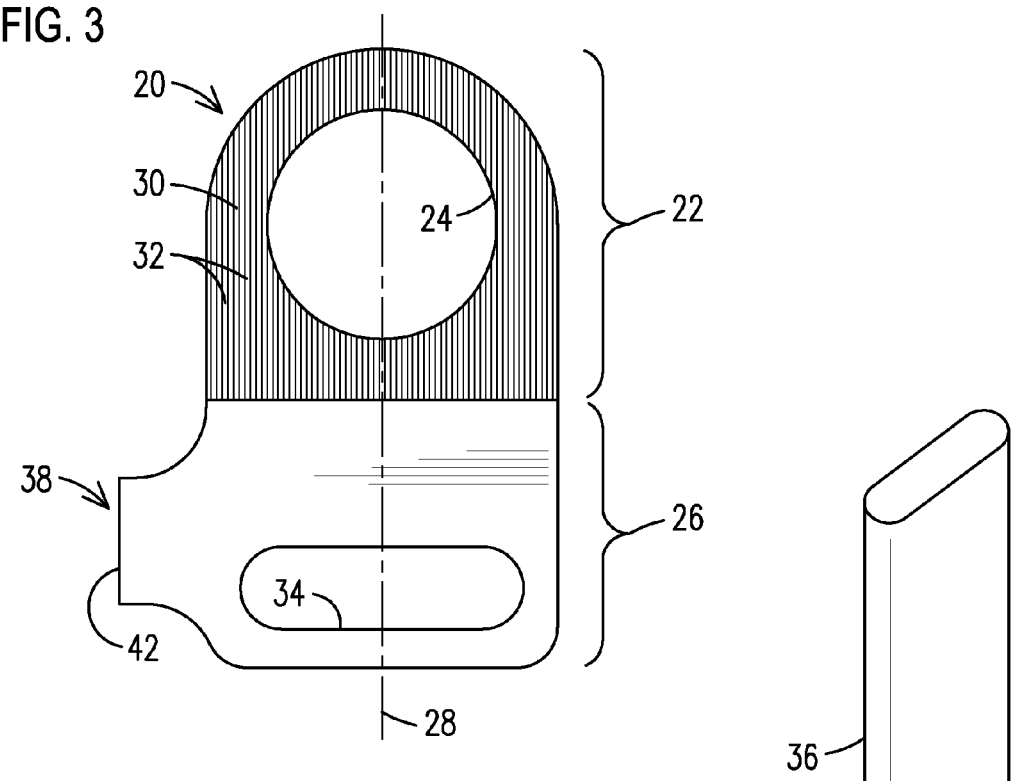
FIG. 3 is an elevational view of an assembly depicting a body comprising a washer member and a fastener-removal member embodying aspects of the present invention.

FIG. 3 is an elevational view of an assembly embodying aspects of the present invention. In one non-limiting embodiment, a body 20 comprises a washer member 22 including a through hole 24 through which fastener 16 (FIG. 2) may be disposed. Body 20 further comprises a fastener-removal member 26 integral with washer member 22. Fastener-removal member 26 extends a predefined distance away from washer member 22 along a longitudinal axis 28 of body 20, which in one non-limiting embodiment comprises a planar body.

Fastener-removal member 26 is arranged to receive a mechanical force effective to remove fastener 16. In one non-limiting embodiment, fastener-removal member 26 is arranged to directly receive the mechanical force without contacting the head of the fastener. It will be appreciated that the disclosed assembly may be analogized to a protective assembly with respect to fastener 16. It will be further appreciated that the disclosed assembly throughout its lifetime may be viewed as a sacrificial assembly with respect to fastener 16. One basic underlying concept is the ability to provide a quick removal of the fastener to maximize the availability of the turbine engine. This quick removal can now be performed without having to directly apply torque to structures of the fastener, such as the head of a fastener, and thus reducing the possibility of damage to the fastener and concomitant delays during servicing operations of the turbine engine involving fastener removal.

In one non-limiting embodiment, washer member 22 comprises a surface 30 comprising serrations or grooves 32 that may be machined or otherwise constructed over surface 30. Surface 30 is arranged to engage a corresponding surface (not shown) of the head of the fastener. As will be appreciated by those skilled in the art, serrations or grooves 32 are conducive for effecting frictional engagement between surface 30 of washer member 22 and the corresponding surface of the head of the fastener. That is, the serrations or grooves 32 constructed over surface 30 may be conceptualized as a means for frictionally engaging the corresponding surface of the head of the fastener to remove the combustion turbine engine component from the casing of the combustion turbine engine. It will be appreciated that the geometry (e.g., serration height, spacing between serrations) and/or spatial arrangement of serrations or grooves 32 over surface 30 may be tailored based on the needs of a given application.

Figure 4:
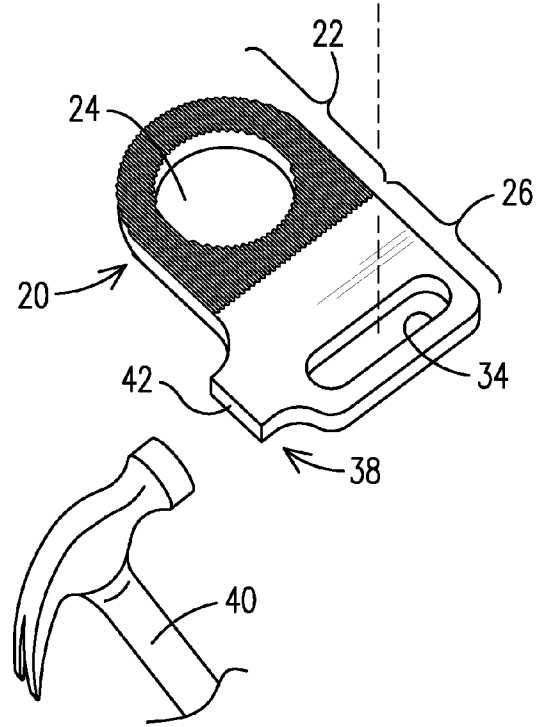
FIG. 4 is an isometric view of an assembly embodying aspects of the present invention including non-limiting examples of modalities by which the fastener-removal member may be used to receive a mechanical force effective to remove a fastener.

In one non-limiting embodiment, fastener-removal member 26 comprises at least an opening 34 that may be configured to receive a lever arm 36 (FIG. 4) to apply the mechanical force, e.g., a torque effective to remove the fastener. In one non-limiting embodiment, fastener-removal member 26 comprises a lateral portion 38 arranged to receive the mechanical force, which in this case may be a shock force applied by an impact-delivery tool 40, (FIG. 4) such as a hammer or a mallet. Optionally, a bumper 42 (e.g., providing structural strengthening) can be integrally constructed on the lateral portion 38 of fastener-removal member 22 to receive the shock force and reduce deformation of fastener-removal member.

Figure 5:
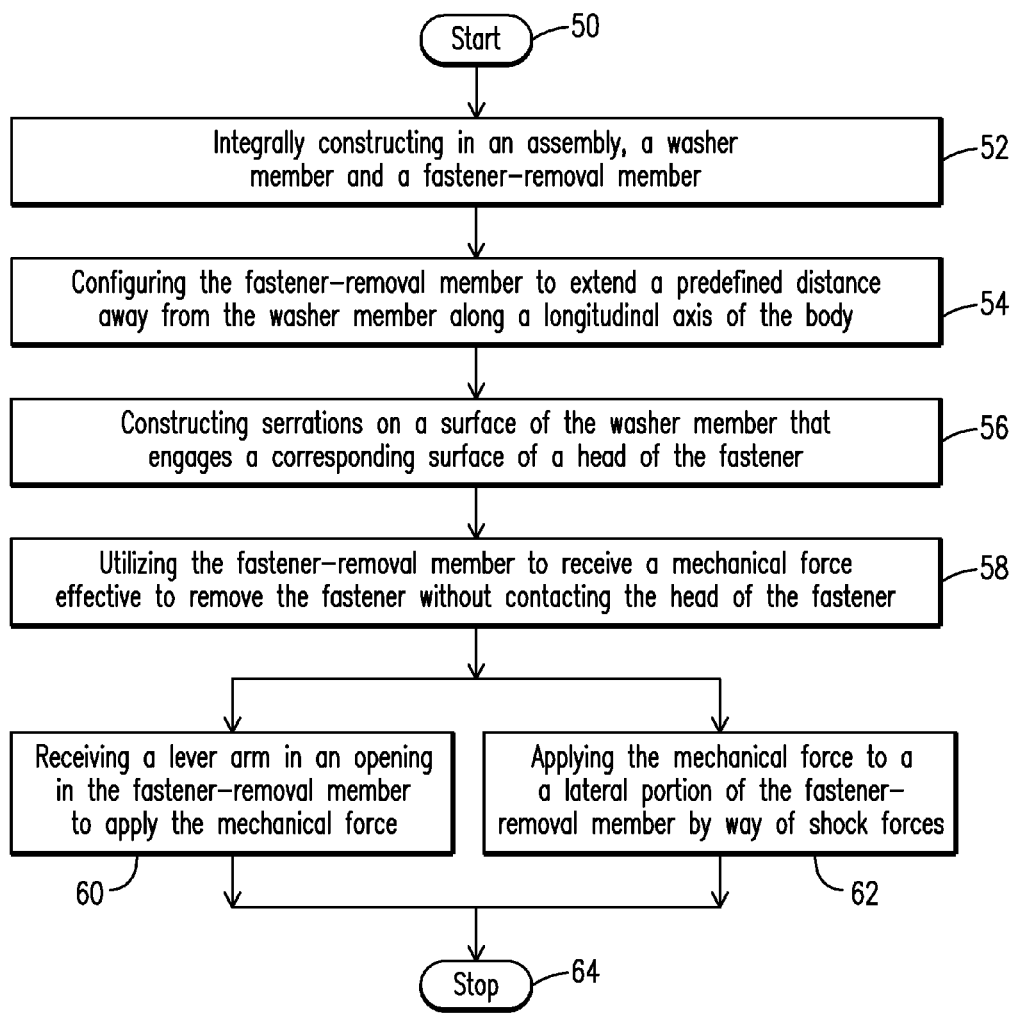
FIG. 5 is a flow chart of a fastener-removal method embodying aspects of the present invention.

FIG. 5 is a flow chart of a method embodying aspects of the present invention. Subsequent to start step 50, step 52 allows integrally constructing in an assembly, a washer member and a fastener-removal member. The washer member includes a through hole to receive a fastener. Step 54 allows configuring the fastener-removal member to extend a predefined distance away from the washer member along a longitudinal axis of the body. Step 56 allows constructing serrations or grooves in a surface of the washer member that engages a corresponding surface of a head of the fastener. In one non-limiting embodiment, step 58 allows utilizing the fastener-removal member to receive a mechanical force effective to remove the fastener without contacting the head of the fastener. Prior to stop step 64, steps 60 and 62 illustrate non-limiting examples of modalities by which the fastener-removal member may be used to receive a mechanical force effective to remove the fastener. Depending on the needs of a given application, steps 60 and 62 may be individually performed; or, optionally, such steps may be sequentially performed in a process involving a combination of both steps. For example, step 62 allows receiving a lever arm in an opening in the fastener-removal member to apply the mechanical force. Step 64 allows applying the mechanical force to a lateral portion of the fastener-removal member by way of shock forces, as may be applied with an impact-delivery tool 40, such as a hammer or a mallet.

In operation, the disclosed assembly and method can be used to reliably and cost-effectively remove fasteners without damaging the fasteners. Embodiments of the disclosed assembly are effective for quick removal of fasteners without having to directly apply torque to structures of the fastener. For example, in the case of a fastener comprising a bolt, the removal can be performed without having to contact the head of the bolt. In one non-limiting application, hardware components, such as may be affixed with M24 bolts or other high-strength fasteners, involving fastening torques of approximately 350 ft-lbs or higher can benefit from disclosed embodiments.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A combustion turbine engine component comprising:
a plurality of assemblies arranged for fastening the combustion turbine engine component to a casing of a combustion turbine engine, each assembly comprising:
a body comprising a washer member including a through hole; and
a fastener disposed in the through hole of the washer member;
wherein the body further comprises a fastener-removal member integral with the washer member, the fastener-removal member extending a predefined distance away from the washer member along a longitudinal axis of the body, the fastener-removal member arranged to receive a mechanical force effective to remove the fastener,
wherein the washer member comprises a surface including means for frictionally engaging a corresponding surface of the head of the fastener to remove the combustion turbine engine component from the casing of the combustion turbine engine.

2. The combustion turbine engine component of claim 1, wherein the fastener comprises a head, and further wherein the fastener-removal member is arranged to directly receive the mechanical force without contacting the head of the fastener.

3. The combustion turbine engine component of claim 2, wherein the means for frictionally engaging the corresponding surface of the head of the fastener comprises a plurality of serrations or grooves arranged to engage the corresponding surface of the head of the fastener.

4. The combustion turbine engine component of claim 1, wherein the body comprises a planar body.

5. The combustion turbine engine component of claim 1, wherein the fastener-removal member comprises at least an opening configured to receive a lever arm to apply the mechanical force.

6. The combustion turbine engine component of claim 1, wherein the fastener-removal member comprises a lateral portion arranged to receive the mechanical force.

7. The combustion turbine engine component of claim 6, wherein the mechanical force comprises a shock force.

8. The combustion turbine engine component of claim 7, further comprising a bumper arranged on the lateral portion of the fastener-removal member to receive the shock force.

9. The combustion turbine engine component of claim 1 comprising a top hat of a combustor.

10. The combustion turbine engine component of claim 1, wherein the fastener is selected from the group consisting of a bolt, a stud and a threaded fastener.

11. The combustion turbine engine component of claim 1, wherein the assembly is structured to receive a fastening torque of at least approximately 350 ft-lbs.

12. A method for fastening a combustion turbine engine component to a casing of a combustion turbine engine, the method comprising:
arranging a plurality of assemblies for fastening the combustion turbine engine component to the casing of the combustion turbine engine;
integrally constructing in each assembly a washer member and a fastener-removal member, the washer member including a through hole to receive a fastener;
configuring the fastener-removal member to extend a predefined distance away from the washer member along a longitudinal axis of the body;
constructing on a surface of the washer member means for frictionally engaging a corresponding surface of the head of the fastener to remove the combustion turbine engine component from the casing of the combustion turbine engine; and
utilizing the fastener-removal member to receive a mechanical force effective to remove the fastener without contacting the head of the fastener.

13. The method of claim 12, wherein the constructing comprises constructing on the surface of the washer member a plurality of serrations or grooves arranged to engage the corresponding surface of the head of the fastener, the plurality of serrations or grooves constituting the means for frictionally engaging the corresponding surface of the head of the fastener.

14. The method of claim 12, wherein the utilizing of the fastener-removal member to receive the mechanical force comprises at least one of the following:
receiving a lever arm in an opening in the fastener-removal member to apply the mechanical force; and/or applying the mechanical force to a lateral portion of the fastener-removal member by way of shock forces.

* * * * *